United States Patent [19]

Sweetland et al.

[11] Patent Number: 5,769,920
[45] Date of Patent: Jun. 23, 1998

[54] GRAPHITE GUIDE RINGS

[75] Inventors: James E. Sweetland, Decatur; Thomas M. Smith, Grapevine; David H. Dodson, Decatur; Timothy A. Stover, Ponder; Michael E. Easley, Terrin, all of Tex.

[73] Assignee: Union Oil Company of California, El Segundo, Calif.

[21] Appl. No.: 366,358

[22] Filed: Dec. 29, 1994

Related U.S. Application Data

[63] Continuation-in-part of Ser. No. 953,726, Sep. 29, 1992, Pat. No. 5,394,910, which is a continuation-in-part of Ser. No. 937,343, Aug. 27, 1992, abandoned.

[51] Int. Cl.$^6$ ........................................ C03B 9/00
[52] U.S. Cl. ...................... 65/374.15; 65/207; 65/229
[58] Field of Search ............................. 65/170, 225, 207, 65/223, 226, 235, 236, 229, 242, 300, 304, 307, 323, 361, 374.11, 374.15, 375; 277/124, 125, 188 R, DIG. 6; 29/428; 411/427, 436

[56] References Cited

U.S. PATENT DOCUMENTS

| | | |
|---|---|---|
| 3,258,322 | 6/1966 | Donnelly . |
| 3,424,569 | 1/1969 | Huebner . |
| 3,566,830 | 3/1971 | Flamm . |
| 3,573,025 | 3/1971 | Hamilton . |
| 3,596,604 | 8/1971 | Corkery . |
| 4,126,757 | 11/1978 | Smith, Jr. et al. . |
| 4,191,548 | 3/1980 | Fortner et al. . |
| 4,436,543 | 3/1984 | Kasten . |
| 4,576,624 | 3/1986 | Seidel . |
| 4,662,928 | 5/1987 | Dauer . |
| 4,888,040 | 12/1989 | Douglas et al. . |
| 4,950,321 | 8/1990 | DiFrank . |
| 4,995,896 | 2/1991 | Denney et al. ...................... 65/374.15 |
| 5,120,341 | 6/1992 | Nozawa et al. . |
| 5,609,664 | 3/1997 | Olson . |

*Primary Examiner*—Steven P. Griffin
*Attorney, Agent, or Firm*—Yale S. Finkle; William O. Jacobson; Gregory F. Wirzbicki

[57] ABSTRACT

A guide-ring comprises a graphite body and a mechanically attached insert, preferable made of metal. The insert and body form a guide ring supporting a split neck-ring used during glass container manufacturing. The graphite body avoids the need for separate lubrication while being sufficiently strong enough to enable mechanical attachment of the insert. The combination provides the structural integrity needed to resist damage during glass container manufacturing operations and the thermal properties needed to contact hot glass gobs.

22 Claims, 3 Drawing Sheets

GRAPHITE GUIDE RINGS

CLAIM FOR PRIORITY, INCORPORATION BY REFERENCE

This application is a continuation-in-part of patent application Ser. No. 953,726, filed on Sep. 29, 1992, now U.S. Pat. No. 5,394,910 which is continuation-in-part of U.S. patent application Ser. No. 07/937,343, filed on Aug. 27, 1992, now abandoned. These prior filed applications are incorporated in their entirety herein by reference.

FIELD OF THE INVENTION

This invention relates to devices and processes to make glass articles. More specifically, the invention is concerned with providing a guide ring useful in glass container fabrication processes.

BACKGROUND OF THE INVENTION

In the manufacturing of glass articles, such as glass bottles or other containers, various molds and forms are used to shape, guide, size, and hold hot glass as it is being formed into container shapes. In a typical process for manufacturing glass containers, a gob of molten glass is transferred (most typically, by dropping) to a "blank" or preform mold. A bottom portion of the blank mold includes a neck ring to form a neck portion of the eventual glass container. The neck ring is made in two halves which are opened to allow removal of the glass preform, called a parison, and the container fabrication process operating on the parison is continued. The neck ring, prior to being opened, is also typically used to carry the parison from the (opened) blank mold, invert the parison, and position the parison over a second or "blow" mold. The second mold closes around the parison, e.g., as the parison is released from the opening neck ring. Further parison shaping occurs within the blow mold to produce the glass container.

In order to support the neck ring halves, assure proper alignment during neck ring operations, and form a top portion of the parison, a guide ring adjoining the neck ring halves is typically used. The neck ring halves are aligned by and slide on the guide ring. The neck ring halves and the guide ring are typically made of a metal, e.g., bronze, steel, or nickel alloys. Lubricant is applied to metal ring surfaces to facilitate sliding during ring opening and closing operations.

The lubricant is typically applied by "swabbing" the guide ring and/or neck ring halves with a swab stick. Swabbing is accomplished by dipping the swab stick into a bucket containing a swabbing compound i.e., the lubricant, and contacting the parts to be lubricated with the dipped swab stick. The swabbing operation can lead to the contamination of the molds and glass parisons with the swabbing compound and can also result in inadequate/unreliable lubrication, thereby causing operational failures and loss. In addition, swabbing is labor intensive in a glass fabrication process that is otherwise mostly automated.

SUMMARY OF THE INVENTION

These lubrication and other problems are avoided in the present invention by providing a guide ring (or other high temperature slidably contacting component) comprising a ring-shaped graphite body and, preferably, a ring-shaped metal insert mechanically attached to the graphite body. The self-lubricating properties of the graphite body avoid the need for swabbing or other separate lubricating steps. The use of a metal insert as one piece of the two-piece guide ring provides the structural integrity needed to resist chipping and other damage during glass forming or other manufacturing operations.

The graphite body is preferably made of fine grain graphite, which allows the insert to be threaded, press fit, shrink fit, or otherwise mechanically attached to the graphite body. The mechanical attachment is sufficient to retain the insert even under the harsh conditions of glass fabrication or other difficult applications.

BRIEF DESCRIPTION OF THE DRAWINGS

In these figures, it is to be understood that like reference numerals refer to like elements or features.

DETAILED DESCRIPTION OF THE INVENTION

Figure 1:
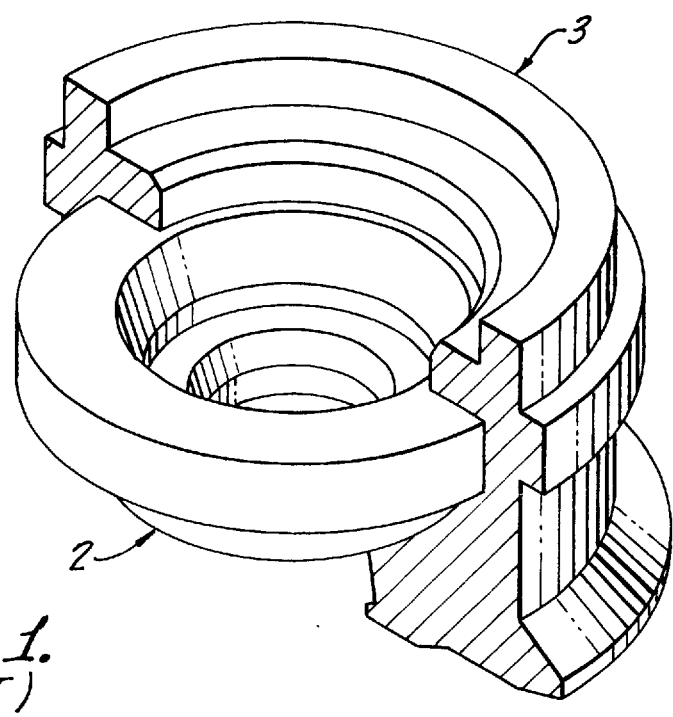
FIG. 1 shows a perspective view of a prior art guide ring and a neck ring half in a position from which a parison is released.

Several different processes are typically used to fabricate glass containers, e.g., a "blow and blow" process where gas pressures are primarily used to form glass containers in two-steps and a "press and blow" process where a plunger is used in the first step instead of gas. FIG. 1 shows a perspective view of prior art equipment used in a "press and blow" process, including a guide ring 2 supporting a split neck ring 3. These rings form a portion of the bottom of a blank or preform mold (not fully shown in the figure) which periodically contact hot glass gobs. Although "press and blow" neck and guide rings are shown, similar rings are used in the "blow and blow" process.

Figure 2:
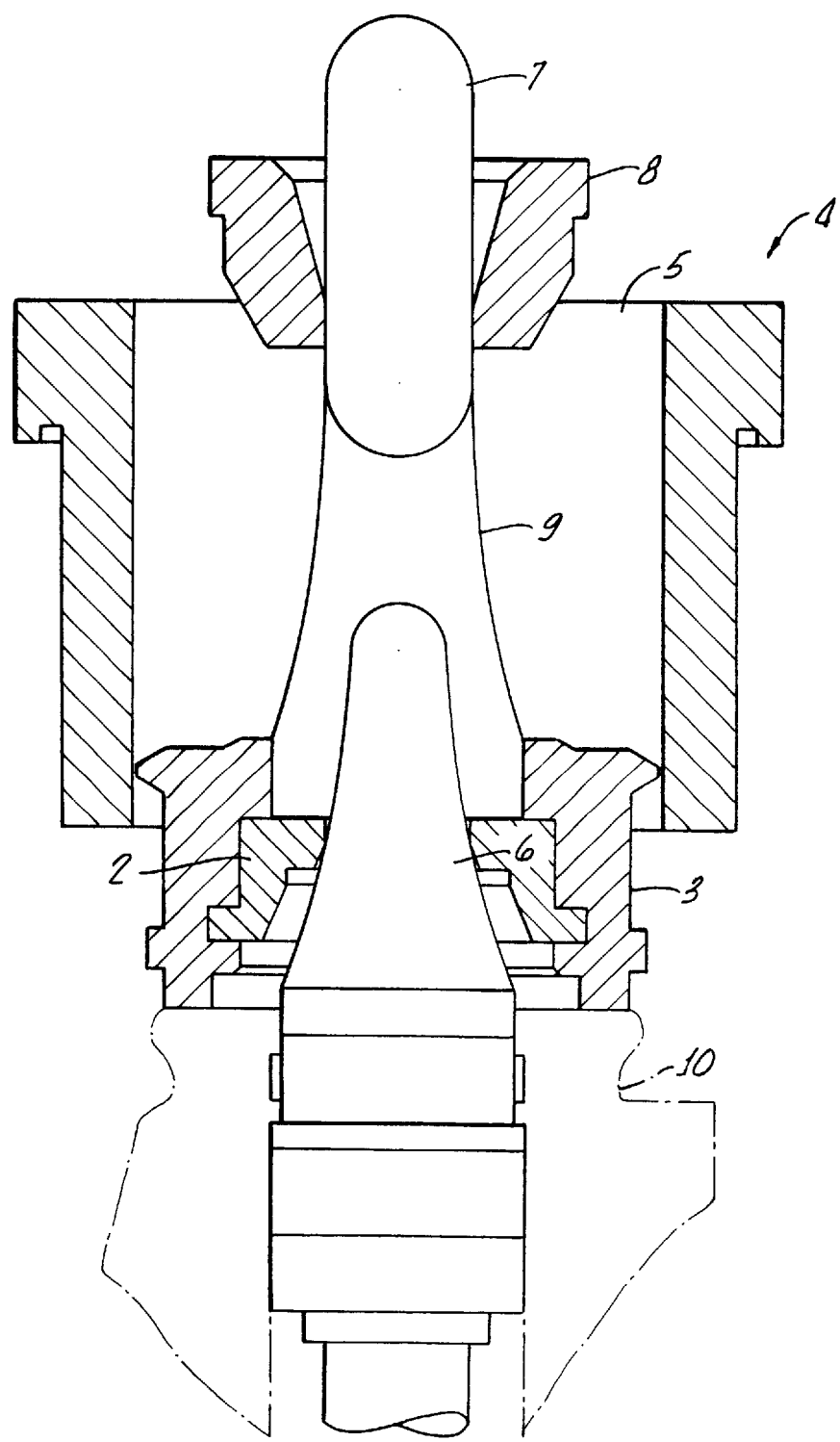
FIG. 2 shows a front cross sectional view of a prior art glass fabrication step in which the guide ring and neck ring are in a position to form the top portion of a parison.

A cross-sectional view of prior art fabrication equipment during a "press and blow" process step is shown in FIG. 2. The blank mold assembly 4 includes a split mold portion 5, a split neck ring 3, and a guide ring 2 through which a plunger 6 can be inserted or "pressed" upward.

The "press and blow" process begins with the plunger 6 retracted in a lower position, leaving an empty preform or blank cavity 9. A glass gob 7 is dropped through a funnel 8 into the preform cavity 9 of the blank mold assembly 4. A portion of equipment 10 is shown dotted for clarity as it supports the blank mold assembly 4 (including neck ring 3) and actuates the plunger 6 upward into the cavity 9.

After the glass gob 7 is dropped, the funnel 8 is removed from the top of the mold assembly 4 and a baffle (not shown) is moved over the top of the mold assembly 4, sealing the mold cavity 9. The plunger 6 is pressed upward into the glass gob 7 through the neck ring halves 3 and guide ring 2 soon after the mold cavity 9 is sealed, forming a parison (preformed glass gob) having outside dimensions shaped by the cavity 9 and interior dimensions shaped by the plunger 6. When the plunger 6 is withdrawn downward and the blank mold portions 5 open, the top of the parison is held by the neck ring 3 and guide ring 2.

The neck ring 3 and held parison are then lifted, inverted, and placed into and/or above a blow mold (not shown in the figure). After placement of the parison at the blow mold, the split neck ring 3 opens, releasing the parison into the blow mold. After reheating the parison, gas is typically allowed to enter through the neck of the parison to "blow" the parison into the shape of the blow mold. The blowing may also be accomplished or assisted by creating a vacuum within the blow mold external to the parison.

After forming the glass container in the blow mold, the mold is opened and the formed glass container is removed for further cooling and processing. The prior art "blow and blow" process is similar except that vacuum and/or gas pressures are primarily used to preshape the parison in a blank mold assembly instead of a large plunger 6. A small plunger may also be used to create a pilot cavity prior to vacuum and/or gas pressures preshaping the parison in a blank mold in the "blow and blow" process.

Figure 3:
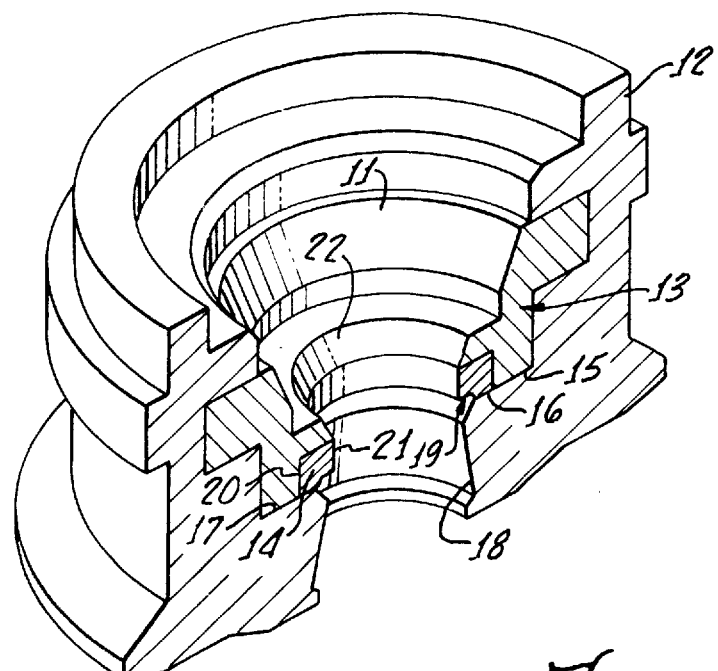
FIG. 3 shows a perspective view of a neck ring half and a guide ring assembled according to the invention.

FIG. 3 shows a perspective cross-sectional view of a graphite guide ring 11 and neck ring half 12 of an embodiment of the present invention. In this embodiment, the neck ring 12 is preferably composed of metal similar to prior art neck ring 3 (shown in FIG. 1), but the guide ring 11 preferably consists of two pieces, i.e., a graphite body 13 and a metal insert 14. The outside diameter of the graphite body 13 is greater than the outside diameter of the metal insert 14. The dimensions of the graphite guide ring 11 are not substantially changed from the comparable one-piece metal guide ring 2 shown in FIG. 1, but the preferred mechanical attachment and at least partial construction using graphite materials allow guide/neck ring sliding to be self lubricated while the metal insert retains the thermal and structural integrity to withstand the periodic hot glass contacting and operational loads.

The ring-shaped graphite body 13 has a planar (graphite) sliding surface 15 which is substantially coplanar with a planar insert surface 16. The graphite sliding surface 15 and the (coplanar) insert surface 16 form a sliding alignment surface. During parison forming, the alignment surface contacts an adjoining (metal) surface 17 of the neck ring half 12 as shown. When the parison is to be released into a blow mold, the adjoining surface 17 slides relative to the alignment surface as the neck ring halves are opened.

The neck ring half 12 has a (metal) neck-forming surface 18 and the guide ring insert has a (metal) top-forming surface 19. During a gob pressing step, the neck ring halves are closed to form a (split) neck ring, and the neck-forming and top-forming surfaces 18 & 19, respectively, contact the hot glass gob 7 (see FIG. 2) to form a portion of the parison. After the neck ring halves 12 are opened and the parison is released into a blow mold, the top- and neck-forming surfaces 19 and 18, respectively, are cooled by exposure to the ambient (air) environment, i.e., convection cooling of the top- and neck forming surfaces and rings occurs.

The ring-shaped metal insert 14 is attached to a recessed surface 20 of the graphite body 13 in a position to form the top surface of the parison when the neck ring is in the inverted position as shown in FIG. 2. This position also allows the metal insert to absorb impacts and loads that might otherwise damage a single component graphite guide ring, e.g., loads from non-aligned operation of plunger 6 as shown in FIG. 2. The positioning of the insert 14 and body 13 to form a coplanar metal and graphite alignment surface also avoids the need for separate lubrication.

The guide ring 11 includes an inward-facing insert surface 21 of the insert 14 and an inward-facing body surface 22. The inward-facing surfaces 21 & 22 help to align the plunger 6 (see FIG. 2) during plunger operation, absorbing impact and other loads.

The body 13 is preferably composed of a fine grain graphite, and the insert 14 is preferably composed of a nickel-composition steel. However, the insert 14 may also be composed of other metals. Because the insert 14 is press fit into the recess surface 20 of the graphite body 13 in this embodiment, the press fit insert is in compression. If the insert 14 is composed of a material having a significantly greater compressive strength than tensile strength, the compressed condition allows the insert to resist greater tensile loads or impacts even if the body 13 and the insert are composed of the same material.

The preferred material for the graphite body 13 is GLASSMATE-HT® fine grain graphite supplied by Poco Graphite, Inc. located in Decatur, Tex. Table 1 provides typical physical properties of the preferred GLASSMATE-HT® graphite material. This graphite material when combined with the assembly and shape of the graphite body 13, provides good resistance to the harsh temperature and erosive environment without the need for lubrication of the neck ring. Alternative materials of construction include GLASSMATE® graphite, GLASSMATE-SR® graphite, and GLASSMATE-LT® graphite, also supplied by Poco Graphite Inc.

TABLE 1

TYPICAL PHYSICAL PROPERTIES OF GLASSMATE-HT ® GRAPHITE

| Property (at room temperature) | Typical Value |
|---|---|
| Density (g/cc) | 1.82 |
| Hardness (Shore Scleroscope) | 75 |
| Flexural Strength (psi) | 12,000 |
| ($Kg/cm^2$) | 845 |
| Compressive Strength (psi) | 20,000 |
| ($Kg/cm^2$) | 1,400 |
| Thermal Conductivity (BTU-ft/$ft^2$-hr-°F.) | 60 |
| (Cal-cm/$cm^2$-sec-°C.) | 0.21 |
| Coefficient of Thermal Expansion (microns/meter/°C.) | 8.4 |

An important physical property of GLASSMATE-HT® graphite is high flexural strength, i.e. 12,000 psi flexural strength is relatively high for graphite materials. A flexural strength of at least 8,000 psi, preferably at least 10,000 psi, allows the graphite body 13 to resist handling without damage, slide against the neck ring halves, and be mechanically attached to the insert 14. The preferred graphite materials of construction also retain most of their flexural strength at elevated temperatures typically encountered in glass fabrication processes.

Another important physical property of GLASSMATE-HT® graphite is its self-lubricating properties (i.e., non-galling) and low coefficient of friction of about 0.1–0.2 when in contact with machined metals such as steel. A coefficient of friction of no more than about 0.3 and the non-galling characteristics of the preferred graphite materials essentially avoid the need for separate lubrication steps.

Figure 4:
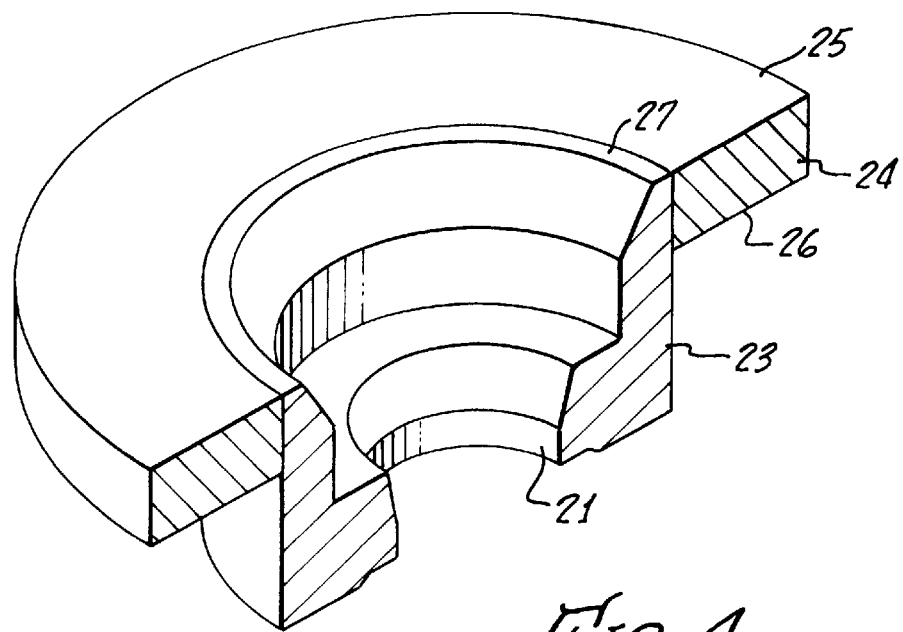
FIG. 4 shows a cross-sectional perspective view of an alternative guide ring assembly in a position from which a parison is released.

An alternative all-graphite embodiment of a guide ring assembly is shown in FIG. 4. Alternative insert 23 and alternative body 24 are both substantially composed of a fine grain graphite, such as GLASSMATE-HT®. Body surface 25 and alternative insert surface 27 form a slidable surface and, along with body surface 26, allow the alternative guide ring assembly to guide the opening and closing of a split neck ring (not shown in FIG. 4).

The alternative insert 23 is shown in FIG. 4 as press fit into alternative body 24, but alternative means for attaching the insert to the body may also be used. For some applications, threaded attachment (similar to that shown in FIG. 5) of the alternative insert 23 to the alternative body 24 is the preferred means for mechanically attaching the insert 23 to body 24. Alternative means for attaching inserts and body components include shrink fit and separate clamps or threaded fasteners.

For some applications, a coating (such as a hard ceramic) may be applied to surfaces of the alternative insert 23, providing added resistance to tensile or impact loads. Examples of hard ceramic materials for coating include titanium carbide and silicon carbide. Although the entire insert 23 can be coated, the coating may also be limited to the inward-facing surface 21.

The (alternative) all graphite embodiment shown in FIG. 4 has disadvantages for some glass industry applications (when compared to the metal-graphite embodiment shown in FIG. 3) and advantages for other glass industry applications. The glass temperature and contact times of an application may exceed the oxidation temperature of the graphite, precluding the use of an all graphite embodiment. Plunger and other loads of an application may require metal reinforcement. If application temperatures and loadings allow, a smaller area of contacting surfaces for an all graphite embodiment may reduce machining costs and machining material waste. Ready accessibility to components of the all graphite embodiment can also simplify replacement of components if damaged or worn.

Figure 5:
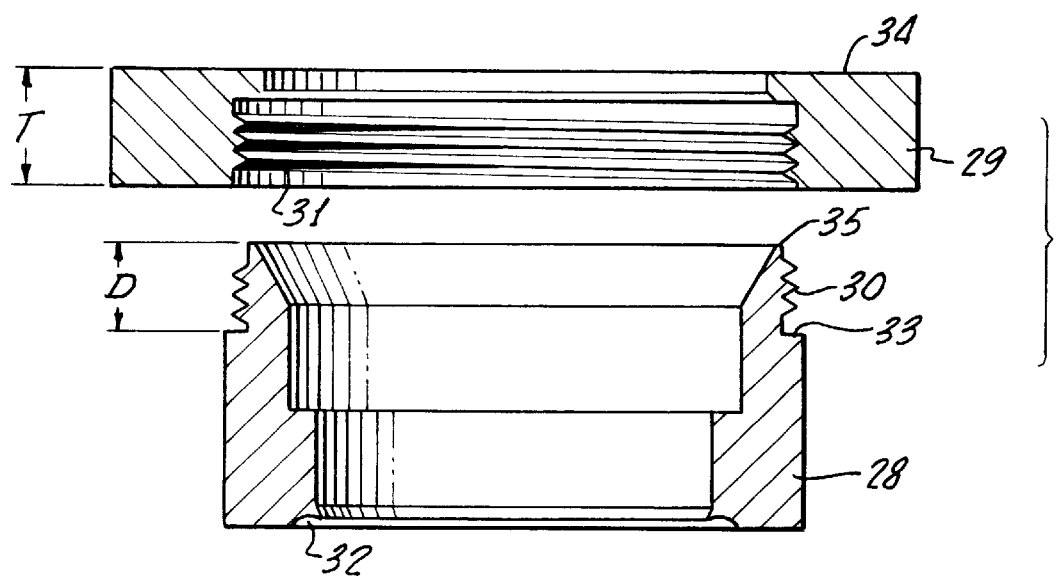
FIG. 5 shows an expanded, cross-sectional side view of a threaded guide ring assembly in a position from which a parison is released.

FIG. 5 shows an expanded, cross-sectional view of another alternative embodiment which is the preferred embodiment. The assembly shown in FIG. 5 comprises a threaded insert 28 having threads 30 and a threaded body 29 having threads 31 adapted to mate with threads 30. The threaded body 29 and insert 28 are similar to the alternative insert 23 and alternative body 24 shown in FIG. 4 except for the mating threaded means for (mechanically) attaching the alternative insert and body. In the preferred embodiment, the threaded insert 28 is substantially composed of nickel (NI-40) steel, and threaded body 29 is substantially composed of fine grain graphite. The (metal) threaded insert 28 has an alternative top-forming surface 32 similar to the top-forming surface 19 of insert 14 shown in FIG. 3.

The threaded attachment of the graphite body 29 to insert 28 is made more feasible by the relatively high flexural strength of the preferred graphite materials, such as GLASSMATE-HT®graphite. The high flexural strength allows the threaded guide ring assembly to withstand significant loads which may be applied during glass fabrication processes.

The thickness "T" dimension of the threaded body 29 is similar to the depth "D" dimension of the threaded insert 28. These dimensions allow the threaded body 29 to be supported by land 33 and create an alignment surface comprising substantially coplanar threaded body top surface 34 and threaded insert top surface 35.

While the preferred embodiment of the invention has been shown and described, and some alternative embodiments also shown and/or described, changes and modifications may be made thereto without departing from the invention. Accordingly, it is intended to embrace within the invention all such changes, modifications and alternative embodiments as fall within the spirit and scope of the appended claims.

What is claimed is:

1. A ring-shaped graphite body used in combination with a separate metal insert to form a two-piece guide ring used in combination with a neck ring in fabricating glass containers from hot glass gobs, said ring-shaped graphite body having a substantially inward-facing surface constructed so as to mechanically attach said graphite body to said separate metal insert to form said two-piece guide ring.

2. A ring-shaped graphite body as defined in claim 1 wherein said substantially inward-facing surface is ring-shaped.

3. A ring-shaped graphite body as defined in claim 2 wherein said substantially inward-facing surface is a threaded surface constructed so as to mate with a threaded surface of said metal insert.

4. A ring-shaped graphite body as defined in claim 1 consisting essentially of graphite having a flexural strength of at least about 8,000 psi.

5. A ring-shaped graphite body as defined in claim 1 further comprising an outward-facing, substantially smooth surface for slidably engaging said neck ring and providing lubrication between said graphite body and said neck ring.

6. A ring-shaped graphite body as defined in claim 5 comprising graphite having a coefficient of friction less than about 0.3.

7. A ring-shaped graphite body as defined in claim 5 comprising graphite having a flexural strength of at least about 10,000 psi.

8. A ring-shaped graphite body used in combination with a separate ring-shaped metal insert to form a two-piece guide ring used in combination with a neck ring in fabricating glass containers from hot glass gobs, said ring-shaped graphite body having a substantially inward-facing, ring-shaped threaded surface constructed so as to mate with an outward-facing, ring-shaped threaded surface of said separate ring-shaped metal insert to form said two-piece guide ring.

9. A ring-shaped graphite body as defined in claim 8 further comprising an outward-facing, substantially smooth surface for slidably engaging said neck ring and providing lubrication between said graphite body and said neck ring.

10. A ring-shaped graphite body as defined in claim 9 comprising graphite having a flexural strength of at least about 10,000 psi and a coefficient of friction less than about 0.3.

11. A two-piece guide ring for use in a process for fabricating glass containers from hot glass gobs comprising:
   (a) a ring-shaped graphite body having a substantially inward-facing surface; and
   (b) a ring-shaped metal insert mechanically attached to said inward-facing surface of said graphite body and having a contact surface for contacting said hot glass gobs.

12. A guide ring as defined in claim 11 wherein said graphite body consists essentially of graphite having a flexural strength of at least about 8,000 psi.

13. A guide ring as defined in claim 11 wherein said insert is mechanically attached to said graphite body by mating threaded surfaces on said body and said insert.

14. A guide ring as defined in claim 13 wherein said metal insert consists essentially of nickel-composition steel.

15. A guide ring as defined in claim 11 wherein a surface of said insert is substantially coplanar with a planar surface of said graphite body.

16. A guide ring as defined in claim 11 wherein said ring-shaped graphite body has upper and lower substantially horizontal surfaces, said ring-shaped metal insert has an outward-facing, ring-shaped external surface, and the outward-facing, ring-shaped external surface of said insert is in mechanically held contact with said substantially inward-facing surface of said graphite body.

17. A guide ring as defined in claim 11 wherein the outside diameter of said graphite body is greater than the outside diameter of said insert.

18. A guide ring as defined in claim 11 wherein said graphite body comprises graphite having a flexural strength of at least about 10,000 psi and a coefficient of friction from about 0.1 to about 0.2.

19. A ring-shaped graphite body used in combination with a separate metal insert to form a two-piece guide ring for use in combination with a neck ring in fabricating glass containers from hot glass gobs, said ring-shaped graphite body having (1) a substantially inward-facing surface for mechanically attaching said graphite body to said metal insert to form said two-piece guide ring, and (2) a substantially outward-facing surface or engaging said neck ring and providing lubrication between said graphite body and said neck ring.

20. A ring-shaped graphite body as defined in claim 19 wherein said substantially inward-facing surface is a threaded surface constructed so as to mate with a threaded surface of said metal insert.

21. A ring-shaped graphite body as defined in claim 19 comprising graphite having a coefficient of friction less than about 0.3 and a flexural strength of at least about 10,000 psi.

22. A ring-shaped graphite body as defined in claim 19 comprising graphite having a coefficient of friction less than about 0.2 and a flexural strength of at least about 12,000 psi.

* * * * *

UNITED STATES PATENT AND TRADEMARK OFFICE
CERTIFICATE OF CORRECTION

PATENT NO. : 5,769,920
DATED : June 23, 1998
INVENTOR(S) : James E. Sweetland et al.

It is certified that error appears in the above-indentified patent and that said Letters Patent is hereby corrected as shown below:

Column 4, line 19, after "material" and before "when" insert -- , --.

Column 8, claim 19, line 1, after "surface" cancel "or" and insert in place thereof -- for --.

Signed and Sealed this

Eighth Day of June, 1999

Attest:

Q. TODD DICKINSON

*Attesting Officer*    Acting Commissioner of Patents and Trademarks